United States Patent
Hirao et al.

(10) Patent No.: US 11,768,862 B2
(45) Date of Patent: Sep. 26, 2023

(54) ESTIMATION DEVICE, DISPLAY CONTROL DEVICE, ESTIMATION SYSTEM, AND ESTIMATION METHOD

(71) Applicant: KABUSHIKI KAISHA TOSHIBA, Tokyo (JP)

(72) Inventors: Shun Hirao, Kawasaki Kanagawa (JP); Kouta Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 657 days.

(21) Appl. No.: 16/564,051

(22) Filed: Sep. 9, 2019

(65) Prior Publication Data
US 2020/0293558 A1 Sep. 17, 2020

(30) Foreign Application Priority Data
Mar. 15, 2019 (JP) .................................. 2019-048818

(51) Int. Cl.
*G06F 7/00* (2006.01)
*G06F 16/28* (2019.01)
*G05B 19/418* (2006.01)

(52) U.S. Cl.
CPC ....... *G06F 16/288* (2019.01); *G05B 19/4183* (2013.01); *G06F 16/285* (2019.01); *G05B 2219/31304* (2013.01)

(58) Field of Classification Search
CPC . G06F 16/288; G06F 16/285; G05B 19/4183; G05B 2219/31304; G05B 2219/31356; G05B 19/4184; Y02P 90/02
See application file for complete search history.

(56) References Cited

U.S. PATENT DOCUMENTS

2007/0068601 A1* 3/2007 Jones ........................ C23C 8/02
148/628
2009/0132345 A1* 5/2009 Meyssami .......... G06Q 30/0204
707/999.005

(Continued)

FOREIGN PATENT DOCUMENTS

JP 2014019819 A * 2/2014
JP 2018159848 A * 10/2018

OTHER PUBLICATIONS

Nakata et al., "A Comprehensive Big-Data-Based Monitoring System for Yield Enhancement in Semiconductor Manufacturing," IEEE Transactions on Semiconductor Manufacturing (Nov. 2017), 30:339-344.

*Primary Examiner* — Isaac M Woo
(74) *Attorney, Agent, or Firm* — Finnegan, Henderson, Farabow, Garrett & Dunner, LLP

(57) ABSTRACT

According to one embodiment, an estimation device acquires a data set from history data. The history data includes a plurality of data IDs, path information, first and second qualitative variables. The data IDs respectively indicate a plurality of data flowing through a plurality of nodes. The path information indicates a path of the nodes for each of the data. The first and second qualitative variables are mutually-independent and indicate classifications of each of the data IDs. The data set includes a part of the data IDs having a first variable value assigned as the first qualitative variable. The estimation device estimates an overall relevance indicating a relevancy to the data set for each of the nodes. The estimation device generates a plurality of partial data sets. The estimation device estimates a partial relevance indicating a relevancy to each of the partial data sets for each of the nodes.

12 Claims, 12 Drawing Sheets

(56) References Cited

U.S. PATENT DOCUMENTS

| | | | |
|---|---|---|---|
| 2011/0190922 A1* | 8/2011 | Walker | B24D 13/142 |
| | | | 700/118 |
| 2014/0278738 A1* | 9/2014 | Feit | G06Q 30/0201 |
| | | | 705/7.29 |
| 2017/0303383 A1* | 10/2017 | Kirkpatrick | H01J 37/317 |
| 2018/0082208 A1* | 3/2018 | Cormier | G06F 16/2365 |
| 2018/0284733 A1* | 10/2018 | Ueyama | G05B 19/0428 |
| 2018/0292807 A1* | 10/2018 | Shindou | G05B 19/4069 |

* cited by examiner

HISTORY DATA

| FIRST QUALITATIVE VARIABLE | SECOND QUALITATIVE VARIABLE | DATA ID | PATH INFORMATION |
|---|---|---|---|
| 1 | A | A01 | [Q1,P1,R1] |
| 2 | B | A02 | [Q2,P2,R2] |
| 2 | B | B01 | [Q3,P3,R2] |
| : | : | : | : |
| : | : | : | : |

SEMICONDUCTOR MANUFACTURING HISTORY DATA

| CLASS | PRODUCT TYPE | WAFER ID | EQUIPMENT HISTORY |
|---|---|---|---|
| 1 | A | A01 | [X1,Y1,Z1] |
| 1 | A | A05 | [X2,Y1,Z2] |
| 1 | A | A07 | [X1,Y2,Z1] |
| 1 | A | A09 | [X1,Y,Z1] |
| 1 | B | B02 | [X3,Y1,Z2] |
| 1 | B | B04 | [X3,Y2,Z2] |
| ⋮ | ⋮ | ⋮ | ⋮ |
| 2 | A | A02 | [X2,Y2,Z2] |
| 2 | B | B01 | [X3,Y1,Z2] |
| ⋮ | ⋮ | ⋮ | ⋮ |

FIG. 8

SEMICONDUCTOR MANUFACTURING HISTORY DATA

| CLASS | PRODUCT TYPE | WAFER ID | EQUIPMENT HISTORY |
|---|---|---|---|
| 1 | A | A01 | [X1,Y1,Z1] |
| 1 | A | A05 | [X2,Y1,Z2] |
| 1 | A | A07 | [X1,Y2,Z1] |
| 1 | A | A09 | [X1,Y,Z1] |
| 1 | B | B02 | [X3,Y1,Z2] |
| 1 | B | B04 | [X3,Y2,Z2] |
| : | : | : | : |
| 2 | A | A02 | [X2,Y2,Z2] |
| 2 | B | B01 | [X3,Y1,Z2] |
| : | : | : | : |

SEMICONDUCTOR MANUFACTURING HISTORY DATA

| CLASS | PRODUCT TYPE | WAFER ID | EQUIPMENT HISTORY |
|---|---|---|---|
| 1 | A | A01 | [X1,Y1,Z1] |
| 1 | A | A05 | [X2,Y1,Z2] |
| 1 | A | A07 | [X1,Y2,Z1] |
| 1 | A | A09 | [X1,Y,Z1] |
| 1 | B | B02 | [X3,Y1,Z2] |
| 1 | B | B04 | [X3,Y2,Z2] |
| : | : | : | : |

FIG. 9

SEMICONDUCTOR MANUFACTURING HISTORY DATA

| CLASS | PRODUCT TYPE | WAFER ID | EQUIPMENT HISTORY |
|---|---|---|---|
| 1 | A | A01 | [X1,Y1,Z1] |
| 1 | A | A05 | [X2,Y1,Z2] |
| 1 | A | A07 | [X1,Y2,Z1] |
| 1 | A | A09 | [X1,Y,Z1] |
| 1 | B | B02 | [X3,Y1,Z2] |
| 1 | B | B04 | [X3,Y2,Z2] |
| : | : | : | : |

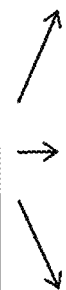

| CLASS | PRODUCT TYPE | WAFER ID | EQUIPMENT HISTORY |
|---|---|---|---|
| 1 | A | A01 | [X1,Y1,Z1] |
| 1 | A | A05 | [X2,Y1,Z2] |
| 1 | A | A07 | [X1,Y2,Z1] |
| 1 | A | A09 | [X1,Y,Z1] |

| CLASS | PRODUCT TYPE | WAFER ID | EQUIPMENT HISTORY |
|---|---|---|---|
| 1 | B | B02 | [X3,Y1,Z2] |
| 1 | B | B04 | [X3,Y2,Z2] |

| CLASS | PRODUCT TYPE | WAFER ID | EQUIPMENT HISTORY |
|---|---|---|---|
| : | : | : | : |
| : | : | : | : |

| CLASS | PRODUCT TYPE | EQUIPMENT | RELEVANCE |
|---|---|---|---|
| 1 | OVERALL | X1 | 0.50 |
| | | X2 | 0.03 |
| | | ⋮ | ⋮ |
| | | Z2 | 0.05 |
| | A | X1 | 0.20 |
| | | X2 | 0.01 |
| | | ⋮ | ⋮ |
| | B | X2 | 0.02 |
| | | ⋮ | ⋮ |
| | ⋮ | ⋮ | ⋮ |

ESTIMATION RESULT OF CLASS 1

| EQUIPMENT | OVERALL | PRODUCT TYPE A | PRODUCT TYPE B | PRODUCT TYPE C | PRODUCT TYPE D |
|---|---|---|---|---|---|
| Y2 | RANK 1 | RANK 5 | RANK 1 | RANK 2 | RANK 2 |
| X1 | RANK 2 | RANK 1 | | RANK 1 | RANK 3 |
| Z2 | RANK 3 | RANK 2 | RANK 2 | | RANK 1 |
| Z1 | RANK 4 | RANK 4 | RANK 5 | | RANK 4 |
| ⋮ | ⋮ | ⋮ | ⋮ | ⋮ | ⋮ |

FIG. 14A

| EQUIPMENT ID | RELEVANCE | PRODUCT TYPE A | PRODUCT TYPE B | PRODUCT TYPE C | PRODUCT TYPE D |
|---|---|---|---|---|---|
| | | ☑ | ☑ | ☑ | ☑ |
| EQUIPMENT E | RANK 1 | RANK 5 | RANK 1 | | RANK 2 |
| EQUIPMENT Q | RANK 2 | RANK 1 | | RANK 2 | RANK 3 |
| EQUIPMENT P | RANK 3 | RANK 2 | RANK 2 | RANK 1 | RANK 1 |
| EQUIPMENT X | RANK 4 | RANK 4 | RANK 5 | | RANK 4 |
| EQUIPMENT B | RANK 5 | RANK 9 | RANK 3 | RANK 5 | |
| EQUIPMENT F | RANK 6 | | RANK 4 | RANK 9 | RANK 8 |
| EQUIPMENT Z | RANK 7 | RANK 6 | | RANK 7 | |
| EQUIPMENT A | RANK 8 | RANK 8 | RANK 7 | RANK 15 | |
| EQUIPMENT U | RANK 9 | | RANK 11 | RANK 4 | RANK 11 |
| EQUIPMENT M | RANK 10 | RANK 3 | RANK 18 | RANK 3 | RANK 6 |
| EQUIPMENT W | RANK 11 | RANK 3 | | | |
| .. | .. | .. | .. | .. | .. |

FIG. 14B

| EQUIPMENT ID | RELEVANCE | PRODUCT TYPE A | PRODUCT TYPE B | PRODUCT TYPE C | PRODUCT TYPE D |
|---|---|---|---|---|---|
| | | ☑ | ☑ | ■ | ☑ |
| EQUIPMENT E | RANK 1 | RANK 5 | RANK 1 | RANK 2 | RANK 2 |
| EQUIPMENT Q | RANK 2 | RANK 1 | | RANK 11 | RANK 3 |
| EQUIPMENT P | RANK 3 | RANK 2 | RANK 2 | | RANK 1 |
| EQUIPMENT X | RANK 4 | RANK 4 | RANK 5 | | RANK 4 |
| EQUIPMENT B | RANK 5 | RANK 9 | RANK 3 | RANK 5 | |
| EQUIPMENT F | RANK 6 | RANK 6 | RANK 4 | RANK 9 | |
| EQUIPMENT Z | RANK 7 | RANK 8 | | RANK 7 | RANK 8 |
| EQUIPMENT A | RANK 8 | | RANK 7 | RANK 15 | |
| EQUIPMENT U | RANK 9 | | | RANK 4 | RANK 11 |
| EQUIPMENT M | RANK 10 | | RANK 11 | | RANK 6 |
| EQUIPMENT W | RANK 11 | RANK 3 | RANK 18 | RANK 13 | |
| .. | .. | .. | .. | .. | .. |

FIG. 14C

| EQUIPMENT ID | RELEVANCE | PRODUCT TYPE A | PRODUCT TYPE B | PRODUCT TYPE C | PRODUCT TYPE D |
|---|---|---|---|---|---|
| | | ☑ | ☑ | □ | ☑ |
| EQUIPMENT P | RANK 3 | RANK 2 | RANK 2 | | RANK 1 |
| EQUIPMENT X | RANK 4 | RANK 4 | RANK 5 | | RANK 4 |
| EQUIPMENT M | RANK 10 | | RANK 11 | | RANK 6 |
| EQUIPMENT N | RANK 33 | RANK 27 | | | RANK 46 |
| .. | .. | .. | .. | .. | .. |

FIG. 15
| CLASS | PRODUCT TYPE | WAFER ID | EQUIPMENT HISTORY | FEATURE VECTOR |
|---|---|---|---|---|
| 1 | A | A01 | [X1,Y1,Z1] | [0,0,0,0,0,1,1] |
| 2 | A | A02 | [X2,Y2,Z2] | [1,1,1,1,0,0,0,0] |
| 2 | B | B01 | [X3,Y3,Z3] | [1,1,1,0,0,0] |
| ⋮ | ⋮ | ⋮ | ⋮ | |
| ⋮ | ⋮ | ⋮ | ⋮ | |
FIG. 16
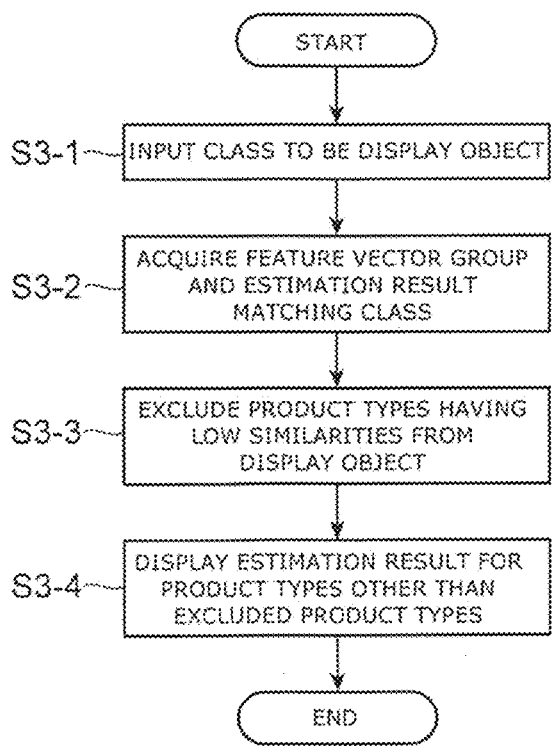
FIG. 17
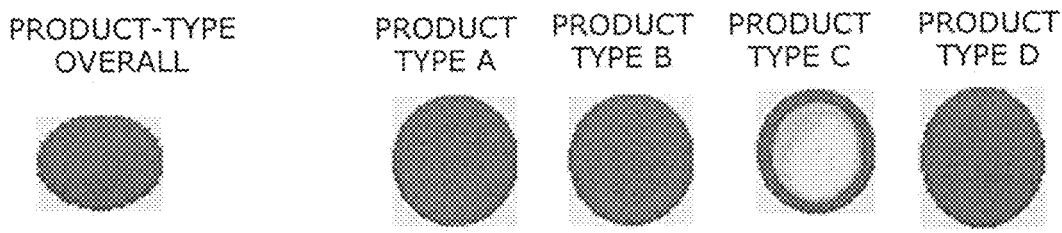

| EQUIPMENT ID | RELEVANCE | PRODUCT TYPE A | PRODUCT TYPE B | PRODUCT TYPE C | PRODUCT TYPE D |
|---|---|---|---|---|---|
| EQUIPMENT P | RANK 3 | RANK 2 | RANK 2 | | RANK 1 |
| EQUIPMENT X | RANK 4 | RANK 4 | RANK 5 | | RANK 4 |
| EQUIPMENT M | RANK 10 | RANK 8 | RANK 11 | | RANK 6 |
| EQUIPMENT N | RANK 33 | RANK 27 | RANK 19 | | RANK 46 |
| ⋮ | ⋮ | ⋮ | ⋮ | ⋮ | ⋮ |

ESTIMATION DEVICE, DISPLAY CONTROL DEVICE, ESTIMATION SYSTEM, AND ESTIMATION METHOD

CROSS-REFERENCE TO RELATED APPLICATIONS

This application is based upon and claims the benefit of priority from Japanese Patent Application No. 2019-048818, filed on Mar. 15, 2019; the entire contents of which are incorporated herein by reference.

FIELD

Embodiments described herein relate generally to an estimation device, a display control device, an estimation system, and an estimation method.

BACKGROUND

There is an estimation device that estimates manufacturing equipment causing defects based on path information of workpieces in a manufacturing line. By using the estimation results obtained from the estimation device, the user can shorten the time necessary to investigate the cause of the defects. To further shorten the time necessary for the investigation by the user, it is desirable to develop technology for the estimation device so that information that is more beneficial to the user can be provided.

BRIEF DESCRIPTION OF THE DRAWINGS

FIG. 8 and FIG. 9 are tables illustrating history data;
FIG. 14A to FIG. 14C are a display example of the estimation system according to the second embodiment;
FIG. 15 is a table illustrating the semiconductor manufacturing history data;
FIG. 16 is a flowchart illustrating the processing of the estimation system according to the third embodiment;
FIG. 17 and FIG. 18 are display examples of the estimation system according to the third embodiment.

DETAILED DESCRIPTION

Figure 1:
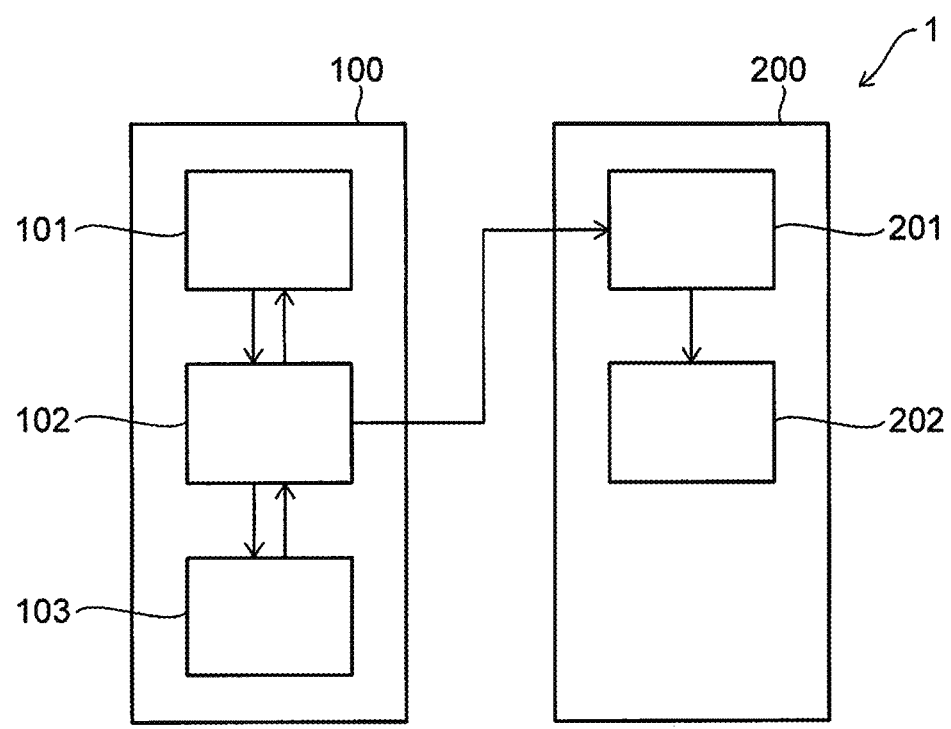
FIG. 1 is a schematic view illustrating an estimation system according to a first embodiment.

According to one embodiment, an estimation device acquires a data set from history data. The history data includes a plurality of data IDs, path information, a first qualitative variable, and a second qualitative variable. The plurality of data IDs respectively indicates a plurality of data flowing through a plurality of nodes. The path information indicates a path of the plurality of nodes for each of the plurality of data. The first qualitative variable and the second qualitative variable are mutually-independent and indicate classifications of each of the plurality of data IDs. The data set includes a part of the plurality of data IDs having a first variable value assigned as the first qualitative variable. The estimation device estimates, based on a part of a plurality of the path information corresponding to the part of the plurality of data IDs, an overall relevance indicating a relevancy to the data set for each of the plurality of nodes. The estimation device generates a plurality of partial data sets by splitting the data set for each variable value of the second qualitative variable. The estimation device estimates, based on the part of the plurality of path information, a partial relevance indicating a relevancy to each of the partial data sets for each of the plurality of nodes.

Various embodiments are described below with reference to the accompanying drawings.

In the specification and drawings, components similar to those described previously or illustrated in an antecedent drawing are marked with like reference numerals, and a detailed description is omitted as appropriate.

First Embodiment

Figure 2:
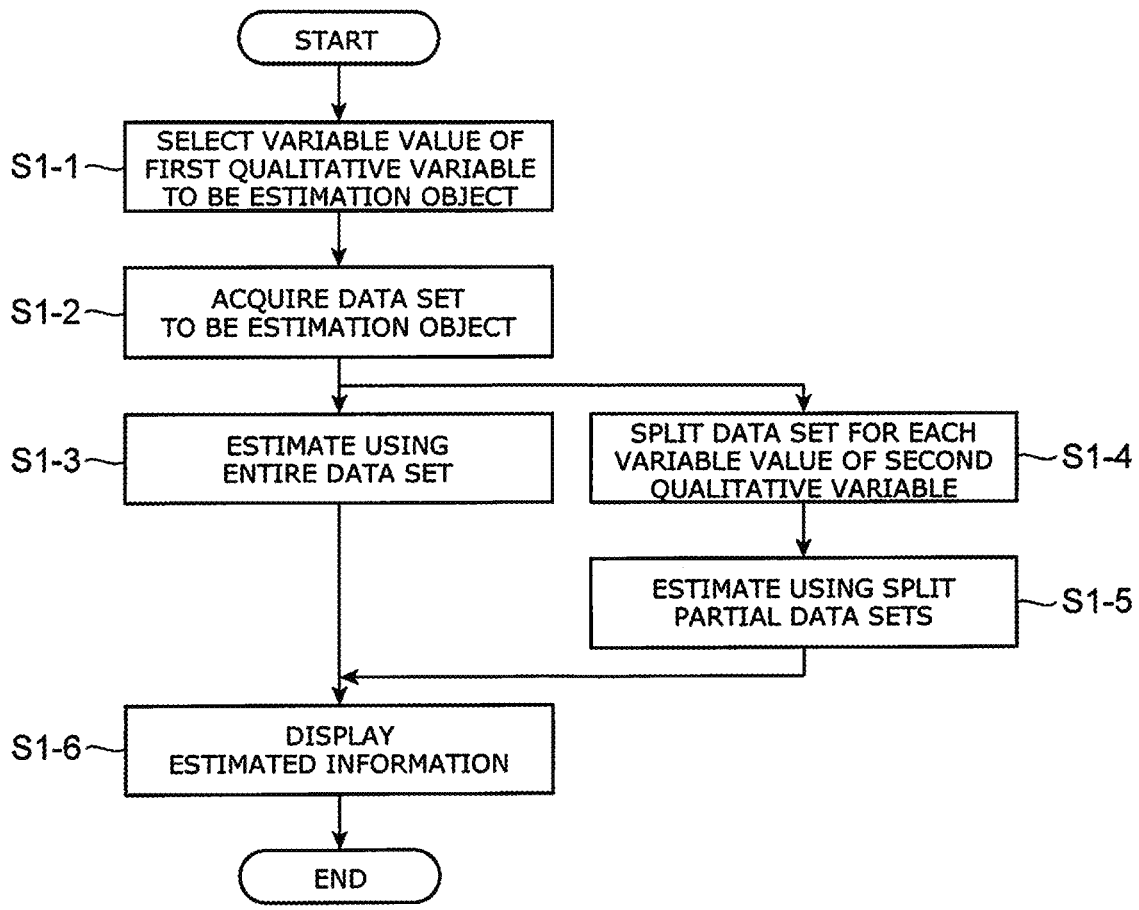
FIG. 2 is a flowchart illustrating the processing of the estimation system according to the first embodiment.
Figures 3, 4:
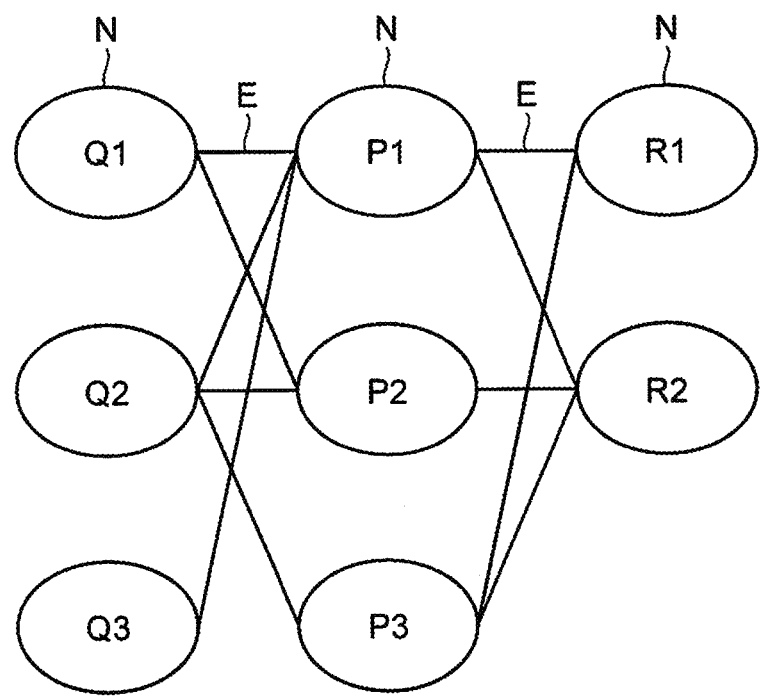
FIG. 3 is a table illustrating history data.
FIG. 4 is a schematic view illustrating a graph structure.

FIG. 1 is a schematic view illustrating an estimation system according to a first embodiment.
FIG. 2 is a flowchart illustrating the processing of the estimation system according to the first embodiment.
FIG. 3 is a table illustrating history data.
FIG. 4 is a schematic view illustrating a graph structure.
As shown in FIG. 1, the estimation system 1 includes an estimation device 100 and a display control device 200. The estimation device 100 estimates the relevancy of each node to the classifications assigned to the data for multiple data flowing through multiple nodes. The display control device 200 causes an external display device to display information based on the estimated results.

The estimation device 100 and the display control device 200 each include, for example, central processing units including processing circuits. The estimation device 100 and the display control device 200 are connected to each other by a wired technique, a wireless technique, or a network. One computer may function as the estimation device 100 and the display control device 200. The display device includes, for example, at least one of a monitor, a projector, or a printer.

The functions of the estimation device 100 and the display control device 200 will now be described in detail. The estimation device 100 includes, for example, a data acquirer 101, a data controller 102, and an estimator 103. The display control device 200 includes, for example, a display controller 201 and a displayer 202.

The data controller 102 requests the data acquirer 101 to acquire data. When receiving the request, the data acquirer 101 accesses an external history data storer and acquires the data. The estimation device 100 may include the history data storer. The history data storer includes, for example, at least one memory device of a hard disk drive (HDD), flash memory, or a network-attached hard disk (NAS).

Specifically, the memory device stores history data relating to multiple data. As shown in FIG. 3, the history data includes multiple data IDs, multiple path information, a first qualitative variable, and a second qualitative variable.

Multiple data IDs are identification information for respectively designating the multiple data. The multiple path information indicates the flow of the multiple data in the graph structure. For example, the path information is represented using multiple node IDs. The node IDs indicate the nodes included in a graph structure when the estimation object is illustrated using the graph structure. FIG. 4 is an example of the graph structure. The graph structure includes multiple nodes N, and edges E linking the nodes N to each other. For example, the data illustrated by the data ID "A01" shown in FIG. 3 passes from a node Q1 through a node P1 to a node R1.

For example, processing of a processing object is performed by equipment. The processing is arbitrary. The processing is, for example, polishing, cleaning, coating, drying, deforming, machining, bonding, depositing, etching, heating, cooling, etc., of a workpiece. Here, the processing object on which processing is performed by the equipment is called a workpiece. Multiple workpieces each pass through multiple equipment while being processed by each equipment. In this case, each equipment may be represented by a node; and the links between the equipment may be represented by edges. The identification information (the equipment ID or the like) that is assigned to the equipment corresponds to the node ID. The information that indicates the equipment that each workpiece passes through corresponds to the path information.

The first qualitative variable and the second qualitative variable each indicate classifications of each of the multiple data IDs. The first qualitative variable and the second qualitative variable are independent of each other. In other words, the first qualitative variable and the second qualitative variable classify each of the multiple data IDs from mutually-different perspectives. For example, for the workpiece data relating to the workpieces, the classification based on the inspection result of the workpiece can be taken as the first qualitative variable; and the classification based on the product type of the workpiece can be taken as the second qualitative variable.

In the history data, the variable value of the first qualitative variable and the variable value of the second qualitative variable are assigned to each of the multiple data. The data controller 102 selects one of the multiple variable values (a first variable value) indicating the first qualitative variable from the history data (step S1-1). The data controller 102 transmits the selection result to the data acquirer 101. Based on the selection result, the data acquirer 101 acquires a data set from the history data of the memory device (step S1-2). The data set is a part of the history data. The data set includes a part of the multiple data having the first variable value assigned as the first qualitative variable, and a part of the multiple path information respectively indicating the paths in the graph structure of the part of the multiple data. The data acquirer 101 transmits the acquired data to the data controller 102.

When receiving the data set, the data controller 102 transmits the data set to the estimator 103. Based on the path information included in the data set, the estimator 103 estimates the overall relevances indicating the relevancy to the multiple data included in the data set for each of the multiple nodes (a first estimation step; step S1-3). For example, a high overall relevance of one node ID indicates that the one node ID has a high relevancy to the multiple data included in the data set.

In the specific example as described above, the variable value of the first qualitative variable is determined based on the inspection result of the workpiece. In such a case, the overall relevances indicate how much relevancy each equipment has with the multiple workpieces classified into one class based on the inspection results. For example, it can be verified from the estimation results of the overall relevances how much each equipment affects one class of defects having a designated trend.

The data controller 102 generates multiple partial data sets by further splitting the multiple data included in the data set for each variable value assigned as the second qualitative variable (step S1-4). One partial data set includes one or more data for which the first qualitative variable is the first variable value and the second qualitative variable is one designated variable value, and includes one or more path information respectively indicating the paths in the graph structure of the one or more data. The data controller 102 transmits the multiple partial data sets to the estimator 103. The estimator 103 performs the following estimation by using the multiple partial data sets separately from the first estimation step.

Based on the path information included in the data set, the estimator 103 estimates partial relevances indicating the relevancy to each partial data set for each of the multiple nodes (a second estimation step; step S1-5). For example, a high partial relevance of one node ID to one partial data set indicates a high relevancy of the one node ID to the data included in the one partial data set.

In the specific example as described above, the variable value of the second qualitative variable is determined based on the product type of the workpiece. In such a case, the partial relevance indicates how much relevancy each equipment has to the workpieces classified into one product type and classified into one class based on the inspection results. For example, it can be verified for each product type from the estimation results of the partial relevances how much each equipment affects one class of defects having a designated trend.

For example, to calculate the overall relevances and the partial relevances, the estimator 103 quantifies the appearance frequency of each equipment in the multiple paths by pattern mining based on the multiple path information. The estimator 103 calculates the overall relevances and the partial relevances based on these numerical values. The estimator 103 may use the numerical values indicating the appearance frequencies as-is as the overall relevances and the partial relevances. For example, when the appearance frequency of one node is high in the path information of the multiple data to which the first variable value is assigned, it is estimated that the one node has a high relevancy to the multiple data to which the first variable value is assigned. The relevance increases as the appearance frequency increases.

The estimator 103 transmits the estimation results including the multiple overall relevances and the multiple partial relevances to the data controller 102. The data controller 102 transmits the estimation results from the estimator 103 to the display control device 200. For example, the data controller 102 transmits the estimation results in a format in which the estimation results relating to the entire data set and the estimation results of each partial data set are discriminable.

The display controller 201 receives the estimation results from the data controller 102. The display controller 201 transmits the received estimation results to the displayer 202. The displayer 202 displays estimated information based on the estimation results so that the user can visually confirm the estimated information (step S1-6). For example, the displayer 202 displays the estimation results relating to the entire data set and the estimation results of each split partial data set.

For example, in a plant, workpieces of multiple product types are processed using multiple equipment. The processed workpieces are inspected for problems for the characteristics, the external appearance, etc. Here, a workpiece is called a defective workpiece when it is decided from the result of the inspection that the required specification cannot be satisfied for the characteristics, the external appearance, etc. When a defective workpiece is made, it is desirable to clarify and eliminate the cause.

To shorten the time necessary for the investigation of the cause by the user, it is effective to use an estimation device that estimates the cause. For example, an estimation device according to a reference example estimates the equipment that is the cause of the defect for each product type based on the path information of each workpiece of the manufacturing line. Because the cause is estimated, it is unnecessary for the user to verify all of the equipment. For example, the user can eliminate the cause of the defect by verifying the equipment estimated to be the cause; and the time necessary for the investigation of the cause can be shortened.

This estimation device is useful for an investigation of a manufacturing line processing workpieces of a small number of product types. Because the number of product types is low, the number of equipment to be confirmed by the user is suppressed to be low even when estimating the equipment that is the cause for each product type.

On the other hand, it is difficult to apply the estimation device according to the reference example to the investigation of a manufacturing line processing workpieces of many product types. Because the number of equipment estimated to be the cause increases when the number of product types is high, the user must confirm much equipment. Accordingly, the time necessary for the user to eliminate the cause of the defect lengthens. Further, as the time necessary to eliminate the cause of the defect lengthens, the period in which defective workpieces are manufactured lengthens; and the downtime of the manufacturing line lengthens. As a result, the yield degrades.

Therefore, an estimation device is desirable in which the manufacturing equipment that is the cause of the defect can be estimated by comprehensively investigating multiple product types.

In the embodiment, the estimation device 100 estimates the overall relevance indicating the relevancy of each node to the multiple data having the first variable value assigned as the first qualitative variable and estimates the partial relevance indicating the relevancy to the multiple data of each node for each variable value of the second qualitative variable. For example, the estimation of the partial relevances corresponds to estimating the equipment that is the cause of the defect for each product type. For example, the estimation of the overall relevance corresponds to comprehensively estimating the equipment that is the cause of the defect for the multiple product types.

Based on the comprehensive estimation result, the user can comprehensively confirm the manufacturing equipment that is the cause of one classification based on the inspection results regardless of the product type. For example, the cause of the defect can be eliminated more efficiently by verifying preferentially from the equipment having high overall relevances.

An example will now be described in which the estimation system according to the first embodiment is used to estimate the cause of defects of the manufacturing line of a semiconductor device.

Figures 5, 6:
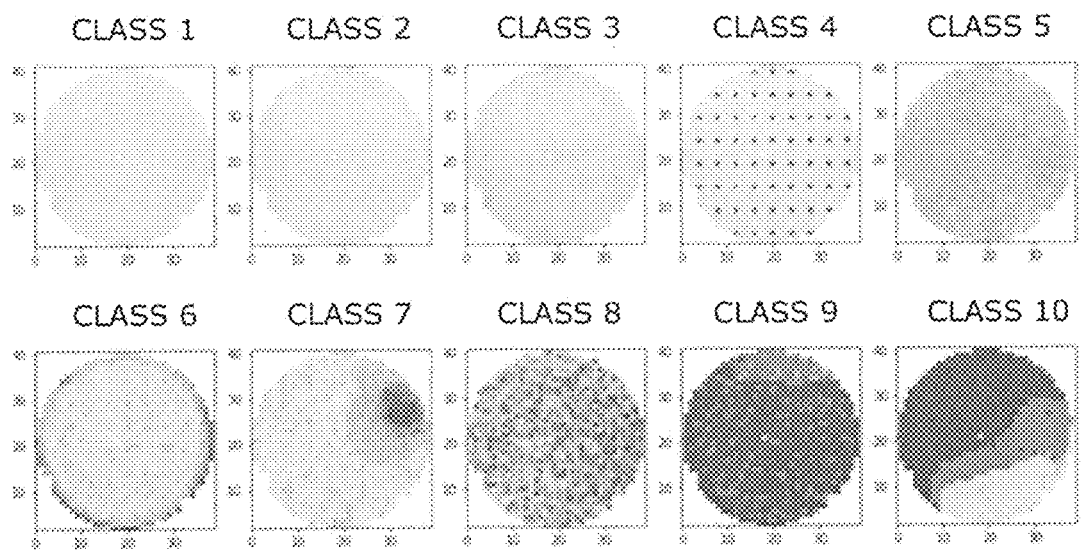
FIG. 5 is a table illustrating semiconductor manufacturing history data.
FIG. 6 and FIG. 7 illustrate the inspection results.

FIG. 5 is a table illustrating semiconductor manufacturing history data.

FIG. 5 shows the semiconductor manufacturing history data which is an example of the history data. The class, the product type, the wafer ID, and the equipment history are stored for each wafer which is the workpiece in the semiconductor manufacturing history data. The class corresponds to the first qualitative variable. The character string that indicates the class corresponds to the variable value of the first qualitative variable. The product type corresponds to the second qualitative variable. The character string that indicates the product type corresponds to the variable value of the second qualitative variable. The wafer ID corresponds to the data ID.

The equipment history corresponds to the path information. In the example of FIG. 5, the equipment history is represented by a vector using the equipment IDs. For example, the path information of the wafer indicated by the wafer ID "A01" indicates that the wafer passed from the equipment "X1" through the equipment "Y1" to the equipment "Z1."

By processing each wafer, multiple chips are manufactured from one wafer. The character string of the product type indicates the type of the product to which the chip is applied. For example, the character string of the product type is set for each customer to which the chip or the product is delivered and for each required specification of the chip. For example, when two chips having mutually-different specifications are delivered to one customer, mutually-different character strings are set for the two chips. When two chips having the same specification are delivered to two mutually-different customers, mutually-different character strings are set for the two chips.

Figure 7:
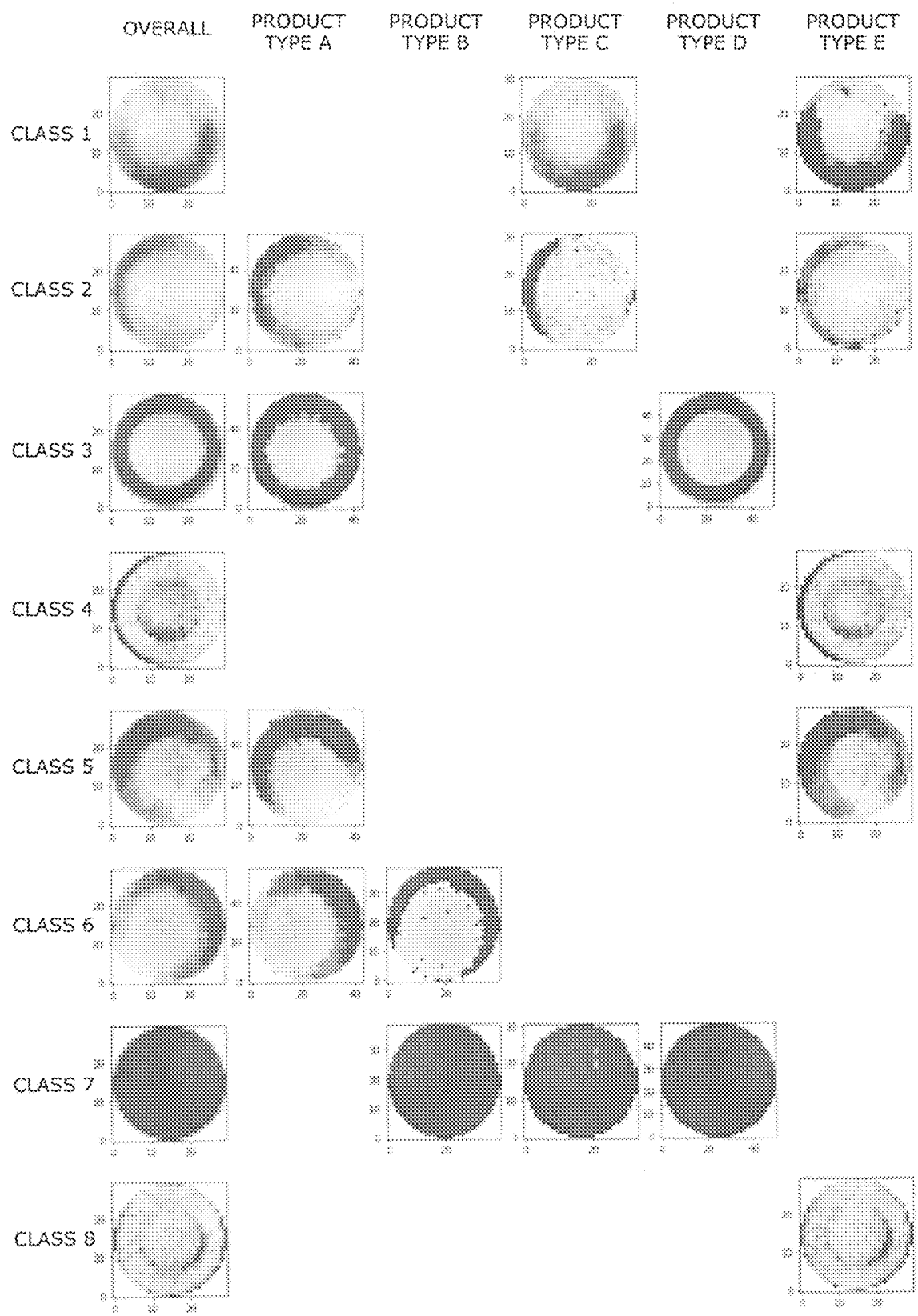

FIG. 6 and FIG. 7 illustrate the inspection results.

The class is the classification based on the inspection result of each wafer. For example, the characteristics and/or the external appearance are inspected by an inspection apparatus for the multiple chips included in each wafer. The characteristics and/or the external appearance are compared to a preset condition; and it is decided whether or not each chip is a good part. For example, in one wafer, the chips decided to be the good parts and the chips decided to be the defective parts are marked with mutually-different colors. Thereby, an image is generated in which the defect occurrence sites of one wafer are mapped.

For example, an external processing device of the estimation system 1 generates an image in which the defect occurrence sites are mapped for each of the multiple wafers. The processing device classifies the generated multiple images and associates the character string indicating the class with each image. A clustering technique is used to classify the images. The processing device generates an average image of the classified multiple images for each class. In the average image, the defect rate at each point of one wafer is shown. FIG. 6 illustrates the average image of the classes.

In the example of FIG. 6, a darker color shows that the defect rate is high. For example, points having dark colors substantially do not exist in the images classified into the class 1 and 2. These images show that defects of the chips substantially do not occur in one wafer. On the other hand, in the image classified into the class 9, points having dark colors exist in substantially the entire surface of the wafer. The image shows that substantially all of the chips are defects in one wafer.

For example, an average image of each class shown in FIG. 6 is generated for each product type. The processing device also may generate the information shown in FIG. 7. FIG. 7 is information based on other inspection results different from the inspection results shown in FIG. 6. In FIG. 7, one row corresponds to one class. The second to sixth columns from the left illustrate average images of each class for each of the five product types. Cells in which there is no display of the average image indicates that no image is classified into that class for that product type. An image in which the images of all product types are averaged is displayed in the leftmost column for each class.

FIG. 8 and FIG. 9 are tables illustrating history data.

The data controller 102 of the estimation device 100 designates the character string (the variable value) of the class of the history data shown in FIG. 5 to be the estimation object. For example, the estimation object is set based on the perspective of the class for which it is desirable to verify the cause of defects. As an example, the data controller 102 selects "1." When the data controller 102 selects "1," the data acquirer 101 acquires the data set to which "1" is assigned as the class from the history data storer as shown in FIG. 8.

Based on the equipment history included in the data set, the estimator 103 calculates the overall relevance indicating the relevancy to the data set to which class "1" is assigned for each equipment. As shown in FIG. 9, the data controller 102 generates multiple partial data sets by splitting the acquired data set for each character string indicating the product type. The estimator 103 estimates the partial relevance indicating the relevancy to each partial data set classified into the class "1" for each equipment based on the equipment history included in the multiple partial data sets. The estimator 103 transmits the estimation results to the data controller 102.

Figures 10, 11:
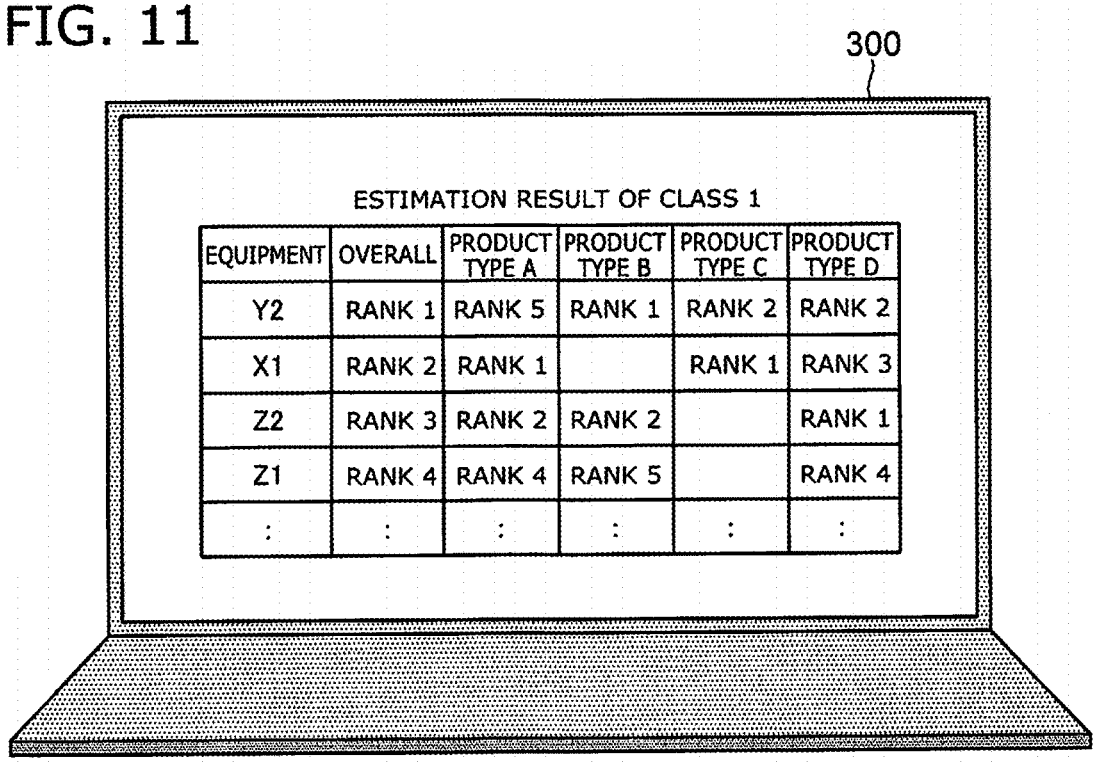
FIG. 10 and FIG. 11 are tables illustrating the estimation results of the estimation system according to the first embodiment.

FIG. 10 and FIG. 11 are tables illustrating the estimation results of the estimation system according to the first embodiment.

The data controller 102 transmits the estimation results of the estimator 103 to the display control device 200. For example, as shown in FIG. 10, the data controller 102 transmits the estimation results in a format in which the estimation results relating to the entire data set and the estimation results of each partial data set are discriminable. In the table shown in FIG. 10, the relevances recited in the row in which the product type is "overall" respectively are the overall relevances of the equipment. The relevances that are recited in the lower rows respectively are the partial relevances of the equipment for each product type.

The display control device 200 receives the estimation results in the display controller 201 and transmits the estimation results to the displayer 202. The displayer 202 displays estimated information based on the estimation results received from the display controller 201. For example, as shown in FIG. 11, the estimated information is displayed in a display device 300 in a tabular format using cross tabulation of the product types and the equipment.

By displaying in the cross-tabulation tabular format, the user easily ascertains the estimation results relating to the product-type overall and the estimation results relating to each product type. As shown in FIG. 11, the displayer 202 may display the rank as the overall relevance and the partial relevance. By displaying the rank, it is unnecessary for the user to compare the magnitudes of the specific values of the equipment; and it is even easier to ascertain the estimation results.

For example, from the results shown in FIG. 11, in the equipment history of the wafers of the class "1," ranks that indicate the relevances for the product types "A" to "D" are provided for the equipment "Y2" estimated to have the highest appearance frequency. Therefore, it can be seen that wafers of all of the product types "A" to "D" are processed and greatly affected by the equipment "Y2." On the other hand, the relevance to the product type "B" is a blank cell for the equipment "X1" estimated to have the second highest appearance frequency in the equipment history of the wafers of the class "1." This shows that the equipment "X1" does not process wafers of the product type "B" included in the class "1."

The display control device 200 can modify the display mode of the estimated information. For example, in the cross table shown in FIG. 11, a combination of each node ID, each overall relevance, and each partial relevance is displayed in the row. The display control device 200 can modify the listing order of these combinations based on the magnitudes of the overall relevances or the magnitudes of the partial relevances.

Instead of the cross table shown in FIG. 11, the display control device 200 may display the table shown in FIG. 10. In the table shown in FIG. 10, a combination of each node ID and each overall relevance are displayed in a row; and a combination of each node ID and each partial relevance is displayed in a row. Also, in the table shown in FIG. 10, these combinations are displayed summarily for each product type. The display control device 200 also may display the estimation results shown in FIG. 10 summarily for each node ID. For example, the operation of modifying the display is input to the display control device 200 by the user.

Second Embodiment

Figure 12:
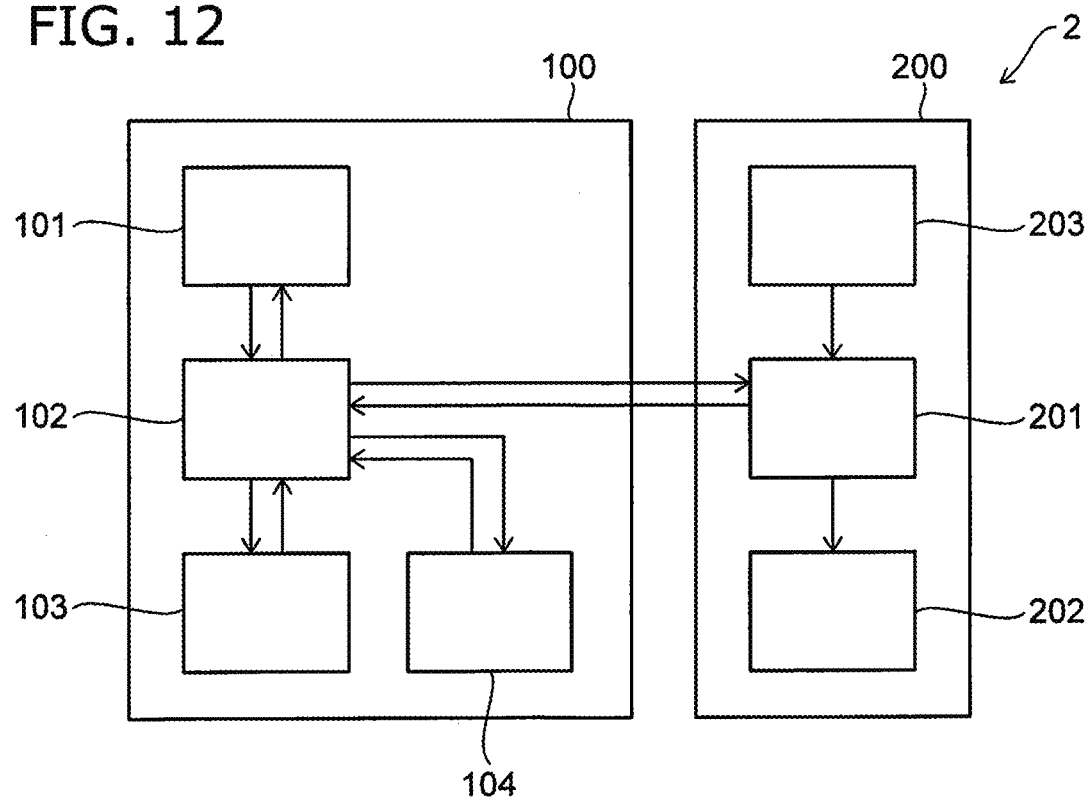
FIG. 12 is a block diagram illustrating an estimation system according to a second embodiment.

FIG. 12 is a block diagram illustrating an estimation system according to a second embodiment.

In the estimation system 2 according to the second embodiment, the estimation device 100 further includes an estimation result storer 104. The display control device 200 further includes an inputter 203. The estimation result storer 104 stores estimation results estimated by the estimator 103. The inputter 203 inputs the estimation results to be displayed by the displayer 202.

Figure 13:
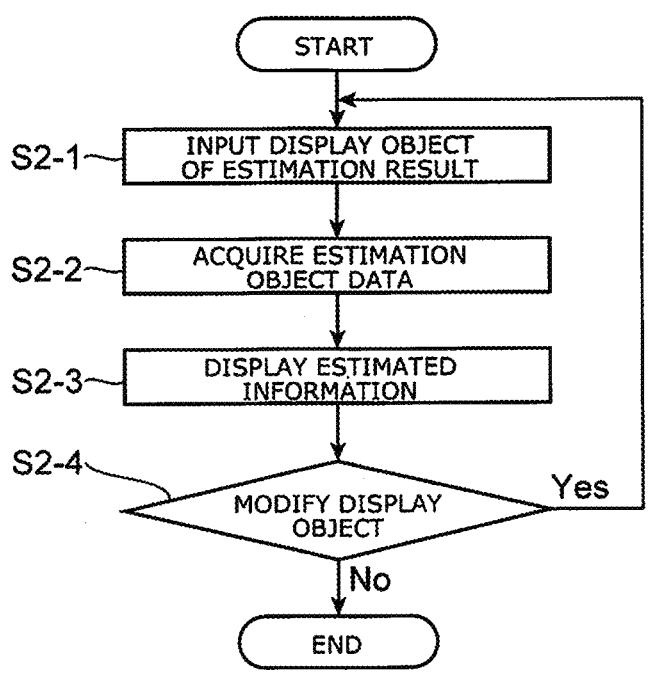
FIG. 13 is a flowchart illustrating the processing of the estimation system according to the second embodiment.

FIG. 13 is a flowchart illustrating the processing of the estimation system according to the second embodiment.

First, the inputter 203 inputs the display object to the display controller 201 for the estimation results to be displayed by the displayer 202 (step S2-1). The display object is designated by designating the character string of the class. Or, the display object may be designated by combining the character string of the class and the character string of the product type. For example, the user inputs information to the display control device 200 by using an input device. The input device includes at least one of a keyboard, a mouse, a touch panel, or a microphone (a voice input). The inputter 203 accepts the information input from the input device and transmits the information to the display controller 201.

When receiving the information from the inputter 203, the display controller 201 acquires the estimation results to be displayed from the data controller 102 (step S2-2). At this time, for example, as described in the first embodiment, the data controller 102 performs an estimation by controlling the data acquirer 101 and the estimator 103 and transmits the estimation results to the display controller 201. Or, the data controller 102 may perform the necessary estimation beforehand and store the estimation results in the estimation result storer 104. When receiving the information from the display controller 201, the data controller 102 acquires the estimation results to be displayed from the estimation result storer 104 and transmits the estimation results to the display controller 201. Or, the display control device 200 may include the estimation result storer 104. In such a case, the display controller 201 acquires the estimation results to be displayed from the estimation device 100 inside the display control device 200.

The estimation result storer 104 performs the role of desynchronizing the estimation processing by the estimation device 100 and the display processing by the display control device 200. By providing the estimation result storer 104, the estimation processing can be pre-performed before the display processing; and the results can be stored. The responsiveness to requests from the user can be improved thereby. Also, when the display control device 200 includes the estimation result storer 104, the display control device 200 can respond independently to the display requests from the user. For example, because the transmission and reception of data is unnecessary between the estimation device 100 and the display control device 200, the responsiveness to requests from the user can be improved further.

The estimation result storer 104 includes, for example, at least one memory device of a HDD or flash memory. Or, the estimation result storer 104 may include NAS and may be provided externally of the estimation device 100 and the display control device 200. For example, the estimation device 100 or the display control device 200 may be connected to the estimation result storer 104 via a network.

The displayer 202 displays estimated information based on the estimation results received from the display controller 201 (step S2-3). For example, similarly to the first embodiment, the displayer 202 displays the received multiple estimation results in a cross-tabulation tabular format for the equipment and the product types. When the estimation results to be displayed include data of multiple classes, the displayer 202 the product type columns of the cross-tabulation table are displayed to be enlarged to the combinations of the classes and the product types.

In addition to the display of the cross-tabulation table, the displayer 202 may display checkboxes, etc., for each product type. For example, the inputter 203 instructs the display or the non-display of a column corresponding to a checkbox to the display controller 201 when the user checks or unchecks the checkbox. Thus, the user can modify the classes or the product types to be displayed by operating the checkboxes.

FIG. 14A to FIG. 14C are a display example of the estimation system according to the second embodiment.

When detecting a modification of the character string of the product type or the character string of the class to be displayed, the inputter 203 notifies, to the display controller 201, the modified set of the character string of the class and the character string of the product type (step S2-4). For example, FIG. 14A shows the estimation results based on the overall data classified into one class. For example, when some user desires to confirm estimation results in which the product type "C" is excluded from the estimation results, the user unchecks the checkbox corresponding to the product type "C" as shown in FIG. 14B. Based on this operation, the inputter 203 instructs the display controller 201 not to display the product type "C."

The display controller 201 compares the set of the character string of the class and the character string of the product type received from the inputter 203 to the multiple sets of each character string of the class and each character string of the product type transmitted to the displayer 202. When the set that is received from the inputter 203 is included in the multiple sets transmitted to the displayer 202, the display controller 201 deletes, from the cross-tabulation table being displayed, the entire row for the rows in which the overall relevance or the partial relevance is displayed in the column corresponding to the set received from the inputter 203.

In the example shown in FIG. 14B, the product type "C" corresponds to the product type being displayed. The display controller 201 deletes the estimation results of the entire row for the rows of the equipment "E," the equipment "Q," etc., in which a relevance is displayed in the column of the product type "C." As a result, as shown in FIG. 14C, the display controller 201 displays the equipment "P" highest in the estimation results. The wafers of the product types "A," "B," and "D" pass through the equipment "P;" and it is estimated that the equipment "P" has the highest relevancy among the equipment not processing the product type "C." From FIG. 14B and FIG. 14C, it can be seen that the equipment that has relevancy to the product type "C" intended by the user is excluded from the displayed estimation results by modifying the display of the displayer 202.

When it is desired to display estimation results including an unchecked product type in addition to the checked product types, the user enters a check at the product type to be added to the estimation. The display controller 201 decides that the class and the product type received from the inputter 203 are not included in the classes and the product types transmitted to the displayer 202. The display controller 201 acquires, from the data controller 102, the estimation results of the class and the product type received from the inputter 203 and displays the estimation results in the table by adding a column. At this time, when equipment not included in the cross-tabulation table of the estimation results being displayed exists in the estimation results of the added column, the display controller 201 adds a row corresponding to the equipment.

According to the estimation system 2 according to the second embodiment, for the estimation results based on the multiple data to which the multiple variable values are assigned as the second qualitative variable, the user can exclude from or add to the displayed estimation results a node (equipment) having a relationship with a designated variable value (a product type). Because the user can modify the display by deleting or adding nodes (equipment), it is easy to investigate each node based on the estimation results.

For example, the user uses the input device to input, to the estimation system 2, a designation of the character string of the class to be investigated. When the input is accepted, the estimation system 2 displays the overall relevance and the partial relevance for each product type for the data of the wafer to which the designated character string of the class is assigned. The user can perform the operation described above and modify the display mode on the displayed screen.

Third Embodiment

Compared to the estimation system according to the second embodiment, an estimation system according to a third embodiment further includes the following elements. The history data further includes a feature vector indicating the feature used as the basis for assigning the variable value of the first qualitative variable. When transmitting the estimation results to the display control device 200, the data controller 102 transmits feature vector groups of the wafers matching the classes and the product types included in the transmitted estimation results. The display controller 201 calculates an average feature vector indicating the average value of the feature vectors for each variable value of the first qualitative variable and each variable value of the second qualitative variable. The displayer 202 displays the average feature vectors.

FIG. 15 is a table illustrating the semiconductor manufacturing history data.

As shown in FIG. 15, the semiconductor manufacturing history data includes a feature vector column in addition to the equipment history of each wafer ID. In the feature vector column, the trend of "good" or "defective" of the chips of each wafer is represented by 0 and 1. The feature vector is utilized as the input for classifying the defect map described in the first embodiment, and is the basis of the class which is the first qualitative variable.

FIG. 16 is a flowchart illustrating the processing of the estimation system according to the third embodiment.

The inputter 203 inputs the displayed class to the display controller 201 (step S3-1). The display controller 201 acquires, from the data controller 102, the feature vector groups and the estimation result of the product-type overall and the estimation results of each product type matching the input character string of the class (step S3-2). The feature vector groups include the multiple feature vectors matching the input character string of the class.

Figure 18:
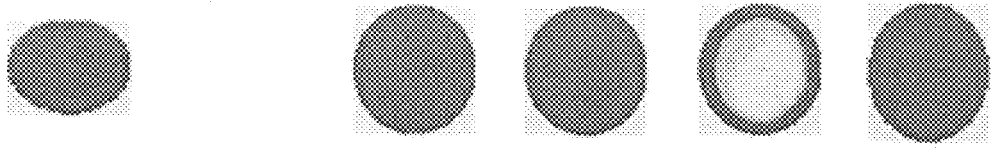

FIG. 17 and FIG. 18 are display examples of the estimation system according to the third embodiment.

The display controller 201 divides the acquired multiple feature vectors into each product type and calculates the average feature vector for each product type. For example, as shown in FIG. 17, the displayer 202 displays the calculated average feature vectors.

The example of FIG. 17 is generated by the following procedure. The displayer 202 sorts, into the product types "A" to "D," the feature vectors of the wafers of the product-type overall belonging to one class. The displayer 202 calculates the average feature vector for each product type. The displayer 202 converts and displays the average feature vector as an average image. Also, on the left side of FIG. 17, the result is displayed in which the average feature vector of all of the product types "A" to "D" is converted into an average image.

The display controller 201 calculates the similarities between the average feature vector of the product-type overall and each average feature vector of the product types. The display controller 201 excludes a product type from the display object when the product type has a low similarity (step S3-3). For example, the Euclidean distance between vectors or the like is used as the similarity.

For example, in the result of FIG. 17, the average defect rate at the central portion of the wafer is low only for the product type "C." The similarity between the average feature vector of the product type "C" and the average feature vector of the product-type overall is lower than the similarities between the average feature vector of the product-type overall and the average feature vectors of many of the product types. The display controller 201 excludes the estimation results of the product type "C" from the display object.

The display controller 201 displays the estimation results of the product types other than the excluded product type in a cross-tabulation tabular format (step S3-4). At this time, similarly to the example of the second embodiment, the display controller 201 displays checkboxes for the display selection, etc., for each product type. The display controller 201 also displays the average image converted from the average feature vector for each product type.

FIG. 18 is an example of the display. For example, the display controller 201 automatically unchecks the product type "C" based on the calculation result of the similarity between the average feature vectors. As shown in FIG. 18, the display controller 201 deletes the entire row from the cross-tabulation table for the rows in which relevances are displayed in the column of the product type "C."

According to the estimation system according to the third embodiment, the product types having low similarities to the feature vector of the product-type overall are removed from the estimation results. The workload necessary for the user to correct the estimation results can be reduced thereby.

In the estimation system according to the third embodiment, a checkbox is displayed for each product type in the display of the estimation results. When the user considers that the decision to exclude the display based on the similarity is mistaken, the user can again add the display of the estimation results by checking the checkbox.

Figure 19:
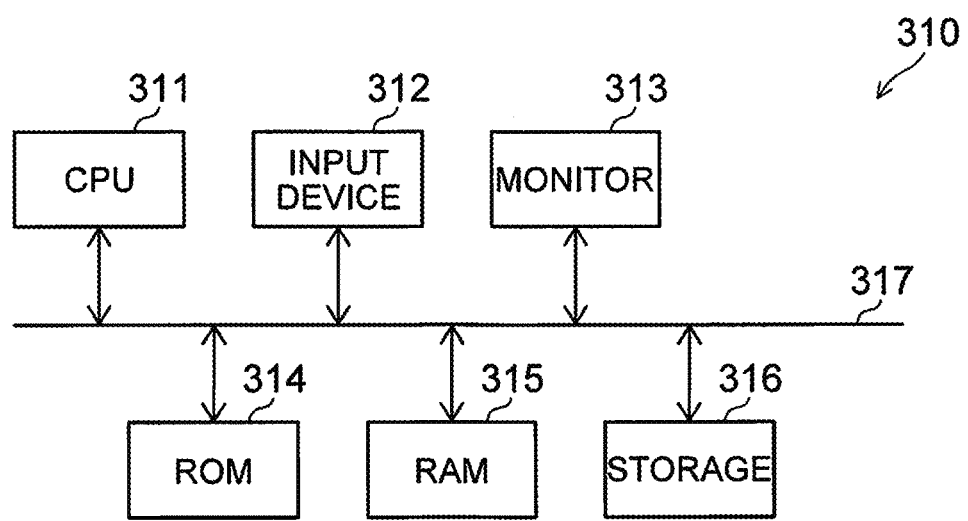
FIG. 19 is a schematic view illustrating the configuration of a monitoring system according to the embodiment.

FIG. 19 is a schematic view illustrating the configuration of a monitoring system according to the embodiment.

For example, the monitoring systems according to the embodiments described above are realized using a computer 310 shown in FIG. 11. The computer 310 includes a CPU (Central Processing Unit) 311, a input device 312, a monitor 313, ROM (Read Only Memory) 314, RAM (Random Access Memory) 315, a storage 316, and a bus 317. The components are connected by the bus 317.

The CPU 311 executes various processing in cooperation with various programs pre-stored in the ROM 314 or the storage 316 and comprehensively controls the operations of the components included in the computer 310. In the processing, the CPU 311 uses a prescribed region of the RAM 315 as a work region. The CPU 311 realizes the input device 312, the monitor 313, the communication device 317, etc., in cooperation with programs pre-stored in the ROM 314 or the storage 316.

The input device 312 includes, for example, at least one of a keyboard, a microphone, or a touch panel. The input device 312 receives the information input from the user as an instruction signal and outputs the instruction signal to the CPU 311. The monitor 313 includes, for example, at least one of a monitor or a speaker. The monitor 313 outputs various information based on the signals output from the CPU 311. The monitor 313 is one example of the display device 300.

The ROM 314 non-reprogrammably stores programs used to control the computer 310, various setting information, etc. The RAM 315 is a volatile storage medium such as SDRAM (Synchronous Dynamic Random Access Memory), etc. The RAM 315 functions as a work region of the CPU 311. Specifically, the RAM 315 functions as a buffer that temporarily stores various variables, parameters, etc., used by the computer 310, etc.

The storage 316 is a reprogrammable recording device such as a storage medium using a semiconductor such as flash memory or the like, a magnetically or optically recordable storage medium, etc. The storage 316 stores programs used to control the computer 310, various setting information, etc. The storage 316 functions as the estimation result storer 30.

According to the embodiments described above, an estimation device, a display control device, an estimation system, an estimation method, a program, and a storage medium can be provided in which a comprehensive estimation can be performed for the data classified into the multiple variable values of the second qualitative variable. By confirming the comprehensive estimation result, the user can more efficiently perform the investigation relating to the multiple nodes. In other words, according to the embodiments, more beneficial information can be provided to the user so that the time necessary for the investigation by the user can shortened further.

The embodiments also are applicable to applications other than the comprehensive estimation and the partial estimation of the manufacturing line described above. For example, in a system in which information is processed by multiple data flowing through multiple computers, when a problem occurs in one of the computers, the computer in which the problem occurs can be estimated comprehensively and partially based on the path information of the data. In this example, the computer corresponds to the node.

According to the embodiments, the invention includes, for example, the following configurations.

Configuration 1

An estimation device,
the estimation device
acquiring a data set from history data,
the history data including a plurality of data IDs, path information, a first qualitative variable, and a second qualitative variable,
the plurality of data IDs respectively indicating a plurality of data flowing through a plurality of nodes,
the path information indicating a path of the plurality of nodes for each of the plurality of data,
the first qualitative variable and the second qualitative variable being mutually-independent and indicating classifications of each of the plurality of data IDs,
the data set including a part of the plurality of data IDs having a first variable value assigned as the first qualitative variable,
estimating, based on a part of a plurality of the path information corresponding to the part of the plurality of data IDs, an overall relevance indicating a relevancy to the data set for each of the plurality of nodes,
generating a plurality of partial data sets by splitting the data set for each variable value of the second qualitative variable, and
estimating, based on the part of the plurality of path information, a partial relevance indicating a relevancy to each of the partial data sets for each of the plurality of nodes.

Configuration 2

The estimation device according to Configuration 1, further comprising an estimation result storer,
the estimation result storer
associating and storing a plurality of the overall relevances and the data set having the first variable value assigned, and
associating and storing each of the plurality of partial data sets and a plurality of the partial relevances.

Configuration 3

The estimation device according to Configuration 1 or 2, further comprising a history data storer storing the history data.

Configuration 4

A display control device, configured to
transmit a designation of the first variable value to the estimation device according to Configuration 1, and
when receiving an estimation result including a plurality of the overall relevances and a plurality of the partial relevances from the estimation device, display estimated information based on the estimation result.

Configuration 5

A display control device, configured to display, when acquiring an estimation result from the estimation result storer according to Configuration 2, estimated information based on the estimation result, the estimation result including a plurality of the overall relevances and a plurality of the partial relevances.

Configuration 6

The display control device according to Configuration 4 or 5, wherein
the estimated information includes a plurality of combinations, the plurality of combinations including one or more combinations from each of a plurality of node IDs and each of the plurality of overall relevances, and one or more combinations from each of the plurality of node IDs and each of the plurality of partial relevances, the plurality of node IDs respectively indicating the plurality of nodes, and
the display control device is configured to display the plurality of combinations by rearranging the plurality of combinations based on a magnitude of each of the plurality of overall relevances or a magnitude of each of the plurality of partial relevances.

Configuration 7

The display control device according to Configuration 6, wherein
a plurality of the variable values of the second qualitative variable is respectively associated with the plurality of combinations, and
the display control device is configured to display the plurality of combinations summarily for each of the node IDs or for each of the variable values of the second qualitative variable.

Configuration 8

The display control device according to Configuration 7, configured to display the plurality of overall relevances and the plurality of partial relevances in a cross-table format with the plurality of node IDs and the plurality of variable values of the second qualitative variable.

Configuration 9

The display control device according to Configuration 7 or 8, configured to display, from the plurality of overall relevances and the plurality of partial relevances, only the overall relevances and the partial relevances for a part of the plurality of nodes having relevancy to all of the plurality of combinations.

Configuration 10

The display control device according to any one of Configurations 4 to 9, wherein
the display control device is configured to accept a designation of a set of the first variable value and one of the variable values of the second qualitative variable, and
the display control device is configured to display, for each of the plurality of nodes when accepting the designation of the set, the overall relevance and the partial relevance estimated for one of the partial data sets having the set assigned.

Configuration 11

The display control device according to Configuration 10, wherein when displaying the partial relevance estimated for the one of the partial data sets, a non-display of the partial relevance is caused when a designation of the set is accepted.

Configuration 12

A storage medium, storing a program,
the program causing a processing device to
acquire a data set from history data,
the history data including a plurality of data IDs, path information, a first qualitative variable, and a second qualitative variable,
the plurality of data IDs respectively indicating a plurality of data flowing through a plurality of nodes, the path information indicating a path of the plurality of nodes for each of the plurality of data, the first qualitative variable and the second qualitative variable being mutually-independent and indicating classifications of each of the plurality of data IDs, the data set including a part of the plurality of data IDs having a first variable value assigned as the first qualitative variable, estimate, based on a part of a plurality of the path information corresponding to the part of the plurality of data IDs, an overall relevance indicating a relevancy to the data set for each of the plurality of nodes, generate a plurality of partial data sets by splitting the data set for each variable value of the second qualitative variable, and estimate, based on the part of the plurality of path information, a partial relevance indicating a relevancy to each of the partial data sets for each of the plurality of nodes.

For example, the processing of the various data recited above is performed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The computer according to the embodiments may include multiple devices connected by a network.

Hereinabove, exemplary embodiments of the invention are described with reference to specific examples. However, the embodiments of the invention are not limited to these specific examples. For example, one skilled in the art may similarly practice the invention by appropriately selecting specific configurations of components such as estimation devices, display control devices, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all estimation devices, display control devices, and estimation systems practicable by an appropriate design modification by one skilled in the art based on the estimation devices, the display control devices, and the estimation systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An estimation system comprising an estimation device, the estimation device extracting a first data set from a history data in semiconductor manufacturing, the history data including a plurality of wafer data, each of the wafer data including a wafer ID, an inspection result of a wafer, a product type of the wafer, and an equipment history indicating a flow of the wafer in a plurality of equipment, the first data set including a part of the plurality of wafer data assigned a first inspection result, the estimation device estimating, based on the first data set, an overall relevance indicating a relevancy to the first data set for each of the plurality of equipment, the estimation device generating a plurality of partial data sets by splitting the first data set for each of a plurality of the product types, the estimation device estimating, based on a part of a plurality of the equipment histories, a partial relevance indicating a relevancy to each of the partial data sets for each of the plurality of equipment, the estimation device being configured to display a plurality of the overall relevances and a plurality of the partial relevances.

2. The estimation system according to claim 1, further comprising an estimation result storer, the estimation result storer associating and storing the plurality of overall relevances and the first data set, and associating and storing each of the plurality of partial data sets and the plurality of partial relevances.

3. The estimation system according to claim 2, further comprising a display control device, the display control device being configured to display, when acquiring an estimation result from the estimation result storer, estimated information based on the estimation result, the estimation result including the plurality of overall relevances and the plurality of partial relevances.

4. The estimation system according to claim 3, wherein the estimated information includes a plurality of combinations, the plurality of combinations including one or more combinations from each of a plurality of equipment IDs and each of the plurality of overall relevances, and one or more combinations from each of the plurality of equipment IDs and each of the plurality of partial relevances, the plurality of equipment IDs respectively indicating the plurality of equipment, and the display control device is configured to display the plurality of combinations by rearranging the plurality of combinations based on a magnitude of each of the plurality of overall relevances or a magnitude of each of the plurality of partial relevances.

5. The estimation system according to claim 1, further comprising a display control device,
the display control device being configured to
transmit a designation of the inspection result to the estimation device according to claim 1, and
when receiving an estimation result including the plurality of overall relevances and plurality of partial relevances from the estimation device, display estimated information based on the estimation result.

6. The estimation system according to claim 5, wherein the estimated information includes a plurality of combinations, the plurality of combinations including one or more combinations from each of a plurality of equipment IDs and each of the plurality of overall relevances, and one or more combinations from each of the plurality of equipment IDs and each of the plurality of partial relevances, the plurality of equipment IDs respectively indicating the plurality of equipment, and
the display control device is configured to display the plurality of combinations by rearranging the plurality of combinations based on a magnitude of each of the plurality of overall relevances or a magnitude of each of the plurality of partial relevances.

7. The estimation system according to claim 1, wherein the estimation device displays a plurality of combinations, the plurality of combinations including one or more combinations from each of a plurality of equipment IDs and each of the plurality of overall relevances, and one or more combinations from each of the plurality of equipment IDs and each of the plurality of partial relevances, the plurality of equipment IDs respectively indicating the plurality of equipment, and
the estimation device rearranges the plurality of combinations based on a magnitude of each of the plurality of overall relevances or a magnitude of each of the plurality of partial relevances.

8. The estimation system according to claim 1, wherein the estimation device associates and displays, with one or more of a plurality of inspection results, a plurality of the overall relevances and a plurality of the partial relevances, and
when accepting a designation of one of the displayed one or more inspection results, the estimation device causes a non-display of the overall relevances and the partial relevances corresponding to the designated inspection result.

9. The estimation system according to claim 1, wherein the estimation device associates and displays, with one or more of a plurality of inspection results, a plurality of the overall relevances and a plurality of the partial relevances, and
the estimation device displays one or more images respectively showing the displayed one or more of the inspection results.

10. The estimation system according to claim 1, wherein a processing is performed for one of the plurality of wafers by one of the plurality of equipment, and
the processing is at least one selected from a group consisting of polishing, cleaning, coating, drying, machining, bonding, depositing, etching, heating, and cooling.

11. An estimation method, comprising:
extracting a first data set from a history data in semiconductor manufacturing, the history data including a plurality of wafer data, each of the wafer data including a wafer ID, an inspection result of a wafer, a product type of the wafer, and an equipment history indicating a flow of the wafer in a plurality of equipment, the first data set including a part of the plurality of wafer data assigned a first inspection result;
estimating, based on the first data set, an overall relevance indicating a relevancy to the first data set for each of the plurality of equipment;
generating a plurality of partial data sets by splitting the first data set for each of a plurality of the product types;
estimating, based on a part of a plurality of the equipment histories, a partial relevance indicating a relevancy to each of the partial data sets for each of the plurality of equipment; and
displaying a plurality of the overall relevancies and a plurality of the partial relevances.

12. The estimation method according to claim 11, wherein a processing is performed for one of the wafers, and
the processing is at least one selected from a group consisting of polishing, cleaning, coating, drying, deforming, machining, bonding, depositing, etching, heating, and cooling.

* * * * *